United States Patent [19]
Dessau et al.

[11] Patent Number: 4,575,573
[45] Date of Patent: Mar. 11, 1986

[54] CATALYSIS OVER ACTIVATED ZEOLITES

[75] Inventors: Ralph M. Dessau, Edison; George T. Kerr, Lawrenceville, both of N.J.

[73] Assignee: Mobil Oil Corporation, New York, N.Y.

[21] Appl. No.: 707,109

[22] Filed: Feb. 28, 1985

Related U.S. Application Data

[63] Continuation-in-part of Ser. No. 566,376, Dec. 28, 1983, Pat. No. 4,517,075, which is a continuation-in-part of Ser. No. 319,175, Nov. 9, 1981, Pat. No. 4,438,215.

[51] Int. Cl.[4] .............................................. C07C 2/68
[52] U.S. Cl. .................................. 585/467; 585/475; 585/481
[58] Field of Search ....................... 585/467, 475, 481

[56] References Cited

U.S. PATENT DOCUMENTS 4,444,900  4/1984  Chang et al. ..................... 502/71
4,461,845  7/1984  Dessau et al. ..................... 502/27
4,515,682  5/1985  Chang et al. ..................... 208/111

Primary Examiner—Curtis R. Davis
Attorney, Agent, or Firm—Alexander J. McKillop; Michael G. Gilman; Dennis P. Santini

[57] ABSTRACT

A process is provided for converting feedstock aromatic compounds by alkylation, transalkylation, disproportionation and/or isomerization over a catalyst comprising a high silica crystalline zeolite which has been treated by contact with aluminum chloride vapor.

21 Claims, No Drawings

CATALYSIS OVER ACTIVATED ZEOLITES

CROSS-REFERENCE TO RELATED APPLICATIONS

This application is a continuation-in-part of application Ser. No. 566,376, filed Dec. 28, 1983, now U.S. Pat. No. 4,517,075, which was a continuation-in-part of application Ser. No. 319,175, filed Nov. 9, 1981, now U.S. Pat. No. 4,438,215.

BACKGROUND OF THE INVENTION

1. Field of the Invention

This invention relates to a process for converting feedstock aromatic compounds comprising benzene and monocyclic alkyl-substituted benzene of from 7 to 10 carbon atoms to product aromatic compounds which differ from feedstock aromatic compounds. The process comprises contacting, under conversion conditions, said feedstock with a catalyst comprising a crystalline zeolite, including a high silica-containing crystalline material, which has been treated by contacting said zeolite with aluminum chloride vapor, followed by hydrolysis and calcination.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by convenient symbols, as illustrated by zeolite ZSM-5 (U.S. Pat. No. 3,702,886).

The use of certain zeolites as catalyst components is taught in U.S. Pat. No. 4,305,808, for example.

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing zeolites such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5. U.S. Pat. Nos. 4,061,724; 4,073,865 and 4,104,294 describe microporous crystalline silicas or organo silicates wherein the aluminum content present is at low levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

U.S. Pat. No. 4,380,685 teaches para-selective alkylation, transalkylation or disproportionation of a substituted aromatic compound to form a dialkylbenzene compound mixture over catalyst comprising zeolite characterized by a constraint index of 1 to 12 and a silica:alumina mole ratio of at least 12:1, the catalyst having thereon incorporated various metals and phosphorus. Other patents covering alkylation and transalkylation include U.S. Pat. Nos. 4,127,616, 4,361,713, 4,365,104, 4,367,359, 4,370,508 and 4,384,155. Toluene is converted to para-xylene in U.S. Pat. Nos. 3,965,207, 3,965,208, 3,965,209, 4,001,346, 4,002,698, 4,067,920, 4,100,215 and 4,152,364, to name a few. Alkylation with olefins is taught, for example, in U.S. Pat. Nos. 3,962,364 and 4,016,218 and toluene is disproportionated in, for example, U.S. Pat. Nos. 4,052,476, 4,007,231, 4,011,276, 4,016,219 and 4,029,716. Isomerization of xylenes is taught in, for example, U.S. Pat. Nos. 4,100,214, 4,101,595, 4,158,676, 4,159,282, 4,351,979, 4,101,597, 4,159,283, 4,152,363, 4,163,028, 4,188,282 and 4,224,141.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio of at least 100.

SUMMARY OF THE INVENTION

The present invention relates to a novel process for converting feedstock aromatic compounds selected from the group consisting of benzene, monocyclic alkyl-substituted benzene of from 7 to 10 carbon atoms and mixtures thereof to product aromatic compounds which differ from said feedstock compounds over a catalyst comprising a zeolite of altered activity resulting from treating the zeolite in a special way. The treatment requires sequentially calcining the synthesized crystalline material under appropriate conditions, contacting the calcined material with aluminum chloride vapor under appropriate conditions, hydrolyzing the aluminum chloride contacted material and calcining the hydrolyzed material under appropriate conditions. The resulting zeolite material exhibits enhanced activity toward catalysis in the present process.

DESCRIPTION OF SPECIFIC EMBODIMENTS

Patents issuing from the patent applications of this application, i.e., U.S. Pat. Nos. 4,438,215 and 4,517,075, are incorporated entirely herein by reference.

The expression "high silica-containing crystalline material" is intended to define a crystalline structure which has an initial silica:alumina mole ratio greater than about 100:1, and more particularly greater than about 500:1, up to and including those highly siliceous materials where the initial silica:alumina mole ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to impurity of the reaction solutions. It is to be understood that the expression "high silica-containing crystalline material" also specifically includes those materials which have other metals besides aluminum associated therewith, such as boron, iron, chromium, etc.

The zeolite starting materials utilized herein, including those having an initial silica:alumina mole ratio greater than about 100:1, may be prepared from reaction mixtures containing sources of various quaternary onium cations. The present process provides noted improvement regardless of which quaternary cation sources are present in said reaction mixtures. Non-limiting examples of cation sources to be used in the manufacture of the zeolite starting materials include onium compounds having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetic, sulfate, carboxylate, etc.). When M is a heteroatom in an alicyclic, heteroalicyclic or heteroaromatic structure, such structure may be, as non-limiting examples,

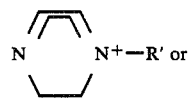

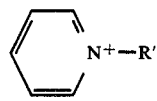

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The process of treating the zeolite for use herein is simple and easy to carry out although the results therefrom are dramatic. The process involves calcining a high silica crystalline material having a silica:alumina mole ratio of at least 100:1, and possibly of at least 500:1, which has been prepared from a reaction mixture containing quaternary onium ions by heating the same at a temperature within the range of from about 200° C. to about 600° C. in an atmosphere such as air, nitrogen, etc. and at atmospheric, superatmospheric, or subatmospheric pressure for from about 1 minute to about 48 hours. The calcined zeolite is thereafter contacted with aluminum chloride vapor, preferably admixed with an inert gas such as nitrogen, at a temperature ranging from about 100° C. to about 600° C. The amount of aluminum chloride vapor which is utilized is not narrowly critical, but usually 0.01 to 1 gram and preferably about 0.5 gram of aluminium chloride is used per gram of high silica crystalline material. Following the contact with aluminum chloride, the crystalline material is then hydrolyzed in water at a temperature ranging from about 20° C. to about 100° C., followed by a final calcination at a temperature ranging from about 200° C. to about 600° C., although temperatures of from about 450° C. to about 550° C. are preferred.

Of the zeolite materials advantageously utilized herein are those with the structure of ZSM-5, ZSM-11, ZSM-5/ZSM-11 intermediate, ZSM-12, ZSM-23, ZSM-35, ZSM-38 or ZSM-48. ZSM-5 is described in U.S. Pat. No. 3,702,886 and U.S. Pat. No. Re. 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate is described in U.S. Pat. No. 4,229,424, the entire teaching of which is incorporated herein by reference. ZSM-12 is described in U.S. Pat. No. 3,832,449, the entire contents of which are incorporated herein by reference. ZSM-23 is described in U.S. Pat. No. 4,076,842, the entire teaching of which is incorporated herein by reference. The entire contents of U.S. Pat. Nos. 4,016,245 and 4,046,859, describing ZSM-35 and ZSM-38, respectively, are incorporated herein by reference. ZSM-48 is described in U.S. Pat. No. 4,397,827, the entire teaching of which is incorporated herein by reference.

Feedstock aromatic compounds converted hereby include individually and in mixture benzene and monocyclic alkyl-substituted benzene of from 7 to 10 carbon atoms having the structure

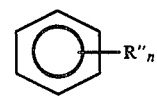

wherein R" is methyl, ethyl or a combination thereof, and n is an integer of from 1 to 4. In other words, the feedstock aromatic compounds may be benzene, benzene containing from 1 to 4 methyl and/or ethyl group substituents, and mixtures thereof. Non-limiting examples of such feedstock compounds include benzene, toluene, xylene, ethylbenzene, mesitylene (1,3,5-trimethylbenzene), durene (1,2,4,5-tetramethylbenzene), pseudocumene (1,2,4-trimethylbenzene) and mixtures thereof.

Other reactant species may be present, such as for alkylation. Alkylating agent species include olefins such as ethylene, propylene, dodecylene, as well as formaldehyde, alkyl halides and alcohols; the alkyl portion thereof having from 1 to 24 carbon atoms. Numerous other acyclic compounds having at least one reactive alkyl radical may be utilized as alkylating agents.

Products of the present conversion process include alkyl-substituted benzene compounds which differ from feedstock compounds depending upon the conversion desired. The following listing presents non-limiting examples:

| Feedstock Aromatic Compounds Include | Other Reactants Include | Product Aromatic Compounds Include |
|---|---|---|
| Benzene | Ethylene | Ethylbenzene |
| Toluene | Methanol | Xylene isomers |
| Xylene isomers, e.g., 9:73:18 wt. ratio of para:meta:ortho | — | Different combination of xylene isomers, e.g. 23:57:20 wt. ratio of para:meta:ortho |
| Toluene | — | Benzene and xylenes |
| Benzene | Propylene | Cumene and diisopropylbenzene |
| Toluene | Propylene | Cymene isomers |

Mechanisms of the present process may be isomerization, alkylation, transalkylation and disproportionation. Disproportionation is a special case of transalkylation in which the alkylatable aromatic compound and the transalkylating agent is the same compound, for example, when toluene serves as the donor and acceptor of a transferred methyl group to produce benzene and xylene. Use of the term transalkylation includes the special case of disproportionation.

In general, the present process is conducted at conversion conditions including a temperature of from about 200° C. to about 760° C., a pressure of from about atmospheric (bar) to about 200 atmospheres, a weight hourly space velocity of from about 0.08 hr$^{-1}$ to about 2000 hr$^{-1}$ and a hydrogen/feedstock hydrocarbon compound mole ratio of from 0 (no added hydrogen) to about 100.

Such conversion processes include, as non-limiting examples, isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 hr$^{-1}$ to about 200 hr$^{-1}$ and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 hr$^{-1}$ to about 20 hr$^{-1}$; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 300° C. to about 500° C., a pressure of from about atmospheric to about 200 atmospheres, a weight hourly space velocity of from about 2 hr$^{-1}$ to about 2000 hr$^{-1}$ and a feedstock aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 hr$^{-1}$ to about 1000 hr$^{-1}$ and a feedstock aromatic hydrocarbon/polyalkylaromatic hydrocarbon mole ratio of from about 1/1 to about 16/1.

In practicing a particularly desired chemical conversion process, it may be useful to composite the above-described activity enhanced crystalline zeolite with matrix comprising material resistant to the temperature and other conditions employed in the process. Such matrix material is useful as a binder and imparts additional resistance to the catalyst for the severe temperature, pressure and reactant feed stream velocity conditions encountered in many cracking processes. The composite may be in the form of an extrudate.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

The catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

The following examples will illustrate the novel method of the present invention.

EXAMPLES 1-5

Four different high silica containing zeolite samples were prepared for use herein—all of which were synthesized from reaction mixtures containing tetraalkylammonium ions. These included three crystalline materials having the x-ray diffraction pattern of ZSM-5, having initial silica-to-alumina mole ratios of 600, 2860 and about 50,000 respectively. One sample of a crystalline material having the x-ray diffraction pattern of ZSM-11 and having an initial silica-to-alumina mole ratio of about 1,056 was also utilized.

The above as synthesized zeolites were calcined in either air or nitrogen at 1° C. per minute to about 540° C. where the temperature was maintained for about 10 hours. Two grams of each of the calcined zeolites were placed in a horizontal tube on one side of a fritted disc and one gram of aluminum chloride was placed on the other side. Dry nitrogen at 50–100 cc per minute was introduced from the direction of the zeolite while heating at 100° C. for one hour. The direction of the nitrogen flow was then reversed and the temperature raised to 500° C. at 2° C. per minute and maintained at 500° C. for ½ hour. After cooling the zeolite was transferred to another reactor and again heated to 500° C. in nitrogen to remove any residual unreacted aluminum chloride.

Each of the four zeolites was then hydrolyzed at 100 ml of water at room temperature for at least two hours. The hydrolyzed samples were filtered, washed well with water, air-dried, and then finally calcined at 540° C. for ten hours.

The results obtained, as well as the properties of the activity enhanced zeolites are shown in Table I.

As can be seen, the alpha value of each of the five zeolites was considerably increased in accordance with the activation method. Furthermore, this enhanced acid activity was clearly intrazeolitic as evidenced by the shape selective constraint index values.

TABLE I

| Example | 1 | 2 | 3 | 4 | 5 |
|---|---|---|---|---|---|
| Zeolite | ZSM-5 | ZSM-5 | ZSM-5 | ZSM-5 | ZSM-11 |
| Si/Al$_2$ | 600 | 2860 | 2500 | 50,000 | 1056 |
| % Al (orig.) | 0.15% | 0.03% | — | 0.01% | 0.1% |
| % Al (after treatment) | 2.55% | 1.63% | — | 1.55% | 1.93% |
| Alpha (orig. in H-form) | 17 (est.) | 3 (est.) | 4 (est.) | 0.004 | 10 (est.) |
| Alpha (after treatment) | 102 | 75 | 100 | 70 | 101 |
| Increase in Alpha | 85 | 72 | 96 | 70 | 91 |
| Constraint Index (after treatment) | — | — | — | 4.1 | 4.8 |

EXAMPLE 6

A sample of the activity enhanced zeolite product from Example 2 is contacted with a feedstock comprising para-, meta- and ortho-xylene in the weight ratio of 9.1:72.5:18.4 at 330° C., 13 atmospheres and a WHSV of 7 hr$^{-1}$. The hydrogen/feedstock hydrocarbon mole ratio is maintained at 4 with continuous hydrogen pass through and no recycle. Analysis of product indicates xylene isomers in the weight ratio relationship of 22.6:57.3:20.1.

EXAMPLE 7

A sample of the activity enhanced zeolite product of Example 3 is contacted with a feedstock comprising benzene and an alkylating agent ethylene in the mole ratio of benzene:ethylene of 3.1:1 at a temperature varied from 315° C. to 385° C. with the pressure maintained at 3.4 atmospheres and the WHSV at 100 hr$^{-1}$. Analysis of liquid product at each above temperature indicates 9 wt.% ethylbenzene at 315° C. and 18 wt.% ethylbenzene at 385° C.

EXAMPLE 8

A sample of the activity enhanced zeolite product of Example 4 is contacted with feedstock comprising toluene and an alkylating agent methanol in the mole ratio of toluene to methanol of 2:1, at 370° C., 3.4 atmospheres and WHSV of 50 hr$^{-1}$. After 20 hours on stream a product is obtained and analyzed to comprise 83.5 wt.% toluene, 2.9 wt.% para-xylene, 4.2 wt.% meta-xylene, 8.4 wt.% ortho-xylene and 1.0 wt.% lighter materials.

EXAMPLE 9

A sample of the activity enhanced zeolite product from Example 5 is contacted with a feedstock comprising 20 parts benzene, 60 parts toluene and 20 parts durene (1,2,4,5-tetramethylbenzene) at 425° C. and 2 atmospheres pressure. The feedstock mixture has a specific gravity of 0.87 at 15° C. and the durene used is 98% pure with a molecular weight of 134.2 and a melting point of 78°–80° C. The product aromatics comprise 16.64 parts benzene, 44.80 parts toluene, 0.41 parts durene, 6.22 parts para-xylene, 12.68 parts meta-xylene and 5.91 parts ortho-xylene.

The Alpha Test is described in U.S. Pat. No. 3,354,078 and in *The Journal of Catalysis*, Vol. 4, pp. 522–529, August, 1965, each incorporated herein by reference as to that description.

The constraint index is a measure of the selectivity of a particular catalyst and it involves conversion of normal hexane and 3-methylpentane. This test is described in many issued U.S. patents, including U.S. Pat. No. 4,231,899, incorporated herein by reference as to that description.

What is claimed is:

1. A process for converting feedstock aromatic compounds selected from the group consisting of benzene, monocyclic alkyl-substituted benzene of from 7 to 10 carbon atoms and mixtures thereof, alkyl being methyl, ethyl or a combination thereof, to conversion product aromatic compounds which differ from feedstock aromatic compounds, which comprises contacting said feedstock at conversion conditions with a catalyst comprising a zeolite material prepared by a method comprising calcining a crystalline zeolite material having an initial silica:alumina mole ratio of at least about 100:1, said crystalline material having been synthesized from a reaction mixture containing quaternary onium ions, contacting said calcined crystalline material with aluminum chloride vapor at a temperature of from about 100° C. to about 600° C., hydrolyzing said aluminum chloride contacted crystalline material and calcining said hydrolyzed crystalline material.

2. The process of claim 1 wherein said zeolite material has an initial silica:alumina mole ratio of at least about 500:1.

3. The process of claim 1 wherein said zeolite material has the structure of ZSM-5, ZSM-11, ZSM-5/ZSM-11 intermediate, ZSM-12, ZSM-23, ZSM-35, ZSM-38 or ZSM-48.

4. The process of claim 3 wherein said zeolite has the structure of ZSM-5 or ZSM-11.

5. The process of claim 1 wherein said catalyst is a composite of said zeolite material and a matrix.

6. The process of claim 5 wherein said matrix is alumina.

7. The process of claim 1 wherein said conversion conditions include a temperature of from about 200° C. to about 760° C., a pressure of from about atmospheric to about 200 atmospheres, a weight hourly space velocity of from about 0.08 hr$^{-1}$ to about 2000 hr$^{-1}$ and a hydrogen/feedstock hydrocarbon compound mole ratio of from 0 to about 100.

8. A process for converting feedstock aromatic compounds selected from the group consisting of benzene, monocyclic alkyl-substituted benzene of from 7 to 10 carbon atoms and mixtures thereof, alkyl being methyl, ethyl or a combination thereof, to conversion product aromatic compounds which differ from feedstock aromatic compounds which comprises contacting said feedstock at conversion conditions with a catalyst comprising a zeolite material prepared by a method comprising calcining a crystalline zeolite material having an initial silica:alumina mole ratio of at least about 100:1 and the structure of zeolite ZSM-5, said crystalline material having been synthesized from a reaction mixture containing quaternary onium ions, contacting said calcined crystalline material with aluminum chloride vapor at a temperature of from about 100° C. to about 600° C., hydrolyzing said aluminum chloride contacted crystalline material and calcining said hydrolyzed crystalline material.

9. The process of claim 8 wherein said zeolite material has an initial silica:alumina mole ratio of at least about 500:1.

10. The process of claim 8 wherein said catalyst is a composite of said zeolite material and a matrix.

11. The process of claim 10 wherein said matrix is alumina.

12. The process of claim 8 wherein said conversion conditions include a temperature of from about 200° C. to about 760° C., a pressure of from about atmospheric to about 200 atmospheres, a weight hourly space velocity of from about 0.08 hr$^{-1}$ to about 2000 hr$^{-1}$ and a hydrogen/feedstock hydrocarbon compound mole ratio of from 0 to about 100.

13. A process for converting feedstock aromatic compounds selected from the group consisting of benzene, monocyclic alkyl-substituted benzene of from 7 to 10 carbon atoms and mixtures thereof, alkyl being methyl, ethyl or a combination thereof, to conversion product aromatic compounds which differ from feedstock aromatic compounds which comprises contacting said feedstock at conversion conditions with a catalyst comprising a zeolite material prepared by a method comprising calcining a crystalline zeolite material having an initial silica:alumina mole ratio of at least about 100:1 and the structure of zeolite ZSM-11, said crystalline material having been synthesized from a reaction mixture containing quaternary onium ions, contacting said calcined crystalline material with aluminum chloride vapor at a temperature of from about 100° C. to about 600° C., hydrolyzing said aluminum chloride contacted crystalline material and calcining said hydrolyzed crystalline material.

14. The process of claim 13 wherein said zeolite material has an initial silica:alumina mole ratio of at least about 500:1.

15. The process of claim 13 wherein said catalyst is a composite of said zeolite material and a matrix.

16. The process of claim 15 wherein said matrix is alumina.

17. The process of claim 13 wherein said conversion conditions include a temperature of from about 200° C. to about 760° C., a pressure of from about atmospheric to about 200 atmospheres, a weight hourly space velocity of from about 0.08 hr$^{-1}$ to about 2000 hr$^{-1}$ and a hydrogen/feedstock hydrocarbon compound mole ratio of from 0 to about 100.

18. The process of claim 1 wherein said feedstock aromatic compounds comprise benzene and said conversion comprises alkylation of said benzene.

19. The process of claim 1 wherein said feedstock aromatic compounds comprise toluene and said conversion comprises disproportionation of said toluene.

20. The process of claim 1 wherein said feedstock aromatic compounds comprise xylene isomers and said conversion comprises isomerization of said xylene isomers.

21. The process of claim 1 wherein said feedstock aromatic compounds comprise alkyl-substituted benzene compounds of from 7 to 10 carbon atoms wherein alkyl is methyl, ethyl or a combination thereof and said conversion comprises transalkylation of said alkyl-substituted benzene compounds.

* * * * *